US010677144B2

(12) United States Patent
Cummins et al.

(10) Patent No.: US 10,677,144 B2
(45) Date of Patent: Jun. 9, 2020

(54) HEAT EXCHANGER SYSTEM

(71) Applicant: DENSO Marston Ltd., West Yorkshire (GB)

(72) Inventors: Craig Cummins, West Yorkshire (GB); James Emery, West Yorkshire (GB)

(73) Assignee: DENSO Marston Ltd., West Yorkshire (GB)

( * ) Notice: Subject to any disclaimer, the term of this patent is extended or adjusted under 35 U.S.C. 154(b) by 0 days.

(21) Appl. No.: 15/410,823

(22) Filed: Jan. 20, 2017

(65) Prior Publication Data

US 2017/0211890 A1 Jul. 27, 2017

(30) Foreign Application Priority Data

Jan. 22, 2016 (GB) .................. 1601243.7

(51) Int. Cl.
| | | |
|---|---|---|
| *F02B 29/04* | (2006.01) | |
| *F01P 3/18* | (2006.01) | |
| *F28D 1/04* | (2006.01) | |
| *B60K 11/04* | (2006.01) | |
| *F28D 21/00* | (2006.01) | |

(52) U.S. Cl.
CPC .......... *F02B 29/0412* (2013.01); *B60K 11/04* (2013.01); *F01P 3/18* (2013.01); *F02B 29/0431* (2013.01); *F28D 1/0426* (2013.01); *B60Y 2200/41* (2013.01); *F01P 2003/182* (2013.01); *F28D 2021/0082* (2013.01); *F28D 2021/0094* (2013.01); *Y02T 10/146* (2013.01)

(58) Field of Classification Search
CPC ....... B60K 11/04; F01P 3/18; F01P 2003/182; F01P 2003/185; F01P 2003/187; F01P 2060/02; F01P 2060/04; F01P 2060/045; F02B 29/045; F02B 29/0456; F02B 29/0475; F28D 1/0426; F28D 1/0435; F28D 1/0452; F28D 1/0461; F28D 2021/0082; F28D 2021/0089; F28D 2021/0092; F28D 2021/0094
See application file for complete search history.

(56) References Cited

U.S. PATENT DOCUMENTS

| | | | | |
|---|---|---|---|---|
| 2,063,757 | A * | 12/1936 | Saunders | ............ F28D 1/0316 |
| | | | | 165/153 |
| 4,736,727 | A * | 4/1988 | Williams | ............ B60K 11/04 |
| | | | | 123/41.31 |
| 5,046,550 | A | 9/1991 | Boll et al. | |
| 5,236,336 | A * | 8/1993 | Hitoshi | ............ F28D 1/05383 |
| | | | | 165/153 |
| 6,435,264 | B1 | 8/2002 | Konno et al. | |
| 6,957,689 | B2 * | 10/2005 | Ambros | ............ B60K 11/04 |
| | | | | 123/41.31 |

(Continued)

FOREIGN PATENT DOCUMENTS

| | | | | |
|---|---|---|---|---|
| EP | 0522288 | A1 | 1/1993 | |
| EP | 1962040 | A1 * | 8/2008 | ............ B23P 15/26 |
| EP | 2727756 | A1 | 5/2014 | |

*Primary Examiner* — Eric S Ruppert
*Assistant Examiner* — Hans R Weiland

(57) ABSTRACT

A heat exchanger system includes a radiator and a charge air cooler. The charge air cooler includes two interconnected cores, being a first core mounted next to the radiator and a second core mounted upstream of the radiator so that air output from the first core does not pass through the radiator.

13 Claims, 4 Drawing Sheets

(56) References Cited

U.S. PATENT DOCUMENTS

| | | | | |
|---|---|---|---|---|
| 7,128,178 | B1* | 10/2006 | Heinle | B60K 11/04 180/68.4 |
| 7,464,700 | B2* | 12/2008 | Kolb | F28D 1/0435 123/563 |
| 7,814,963 | B2 | 10/2010 | Adamson et al. | |
| 7,896,062 | B2 | 3/2011 | Adamson et al. | |
| 7,950,443 | B2* | 5/2011 | Rasset | F28D 1/0435 165/140 |
| 8,544,584 | B2* | 10/2013 | Takeda | F01M 5/002 165/41 |
| 9,243,846 | B2 | 1/2016 | Cummins et al. | |
| 2003/0234098 | A1* | 12/2003 | Huang | B60H 1/00028 165/43 |
| 2004/0104007 | A1 | 6/2004 | Kolb | |
| 2005/0109483 | A1* | 5/2005 | Kolb | F28D 1/0435 165/41 |
| 2006/0231234 | A1* | 10/2006 | Kalbacher | F01P 3/18 165/44 |
| 2010/0115771 | A1* | 5/2010 | Johnson | B23K 1/0012 29/890.052 |
| 2014/0202669 | A1 | 7/2014 | Kulesza et al. | |
| 2016/0031311 | A1* | 2/2016 | Inaoka | B60K 11/04 180/68.4 |

* cited by examiner

HEAT EXCHANGER SYSTEM

CROSS REFERENCE TO RELATED APPLICATION

This application is based on UK Patent Application No. 1601243.7 filed on Jan. 22, 2016, the disclosure of which is incorporated herein by reference.

TECHNICAL FIELD

The present disclosure relates to a heat exchanger system.

BACKGROUND

In a heat exchanger system for a vehicle, a charge air cooler and an oil cooler may be mounted upstream of a radiator. In a specific arrangement, air having passed through either the charge air cooler or the oil cooler may pass through the radiator, and consequently, cooling achieved by the radiator may be less effective.

SUMMARY

It is an object of the present disclosure to produce a heat exchanger system configured to exhibit an enhanced performance achieved by a radiator.

According to an aspect of the present disclosure, a heat exchanger system comprises a radiator. The heat exchanger system further comprises a charge air cooler. The charge air cooler includes at least two interconnected cores, including a first core mounted next to the radiator in a direction perpendicular to the air flow direction and generally in the plane of the radiator, neither upstream nor downstream of the radiator, and a second core mounted at an angle to the radiator and upstream of the radiator in the air path, so that air output from the first core does not pass through the radiator.

As the air passing through one of the charge air cooler cores does not pass through the radiator, the air reaching the radiator has received less pre-heating and so the performance of the radiator may be improved. It might be possible to use a smaller radiator in order to achieve the desired performance in this system by means of the disclosure.

The first charge air cooler core may be mounted to one side of the radiator or underneath the radiator. The first core may be mounted on top of the radiator. The first core and the second core may be of the same size. The second core may be at an angle to the radiator in the range 30 to 60°. The second core may be at an angle to the radiator in the range 40 to 50°. The heat exchanger system may further include an oil cooler upstream of the radiator. The oil cooler may be tilted away from the radiator. This means that a longer oil cooler can be used, and also means that there is better access for cleaning between the charge air cooler and the radiator. An angle of tilt of the oil cooler may be in the range 5 to 20°. An angle of tilt of the oil cooler may be in the range 8 to 12°. The second core may be mounted next to the oil cooler. The second core may be mounted above the oil cooler. The at least two interconnected cores may include only the first core and the second core.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

As follows, embodiments of the present disclosure will be described with reference to FIGS. 1 to 5.

Comparative Embodiment

Figure 1:
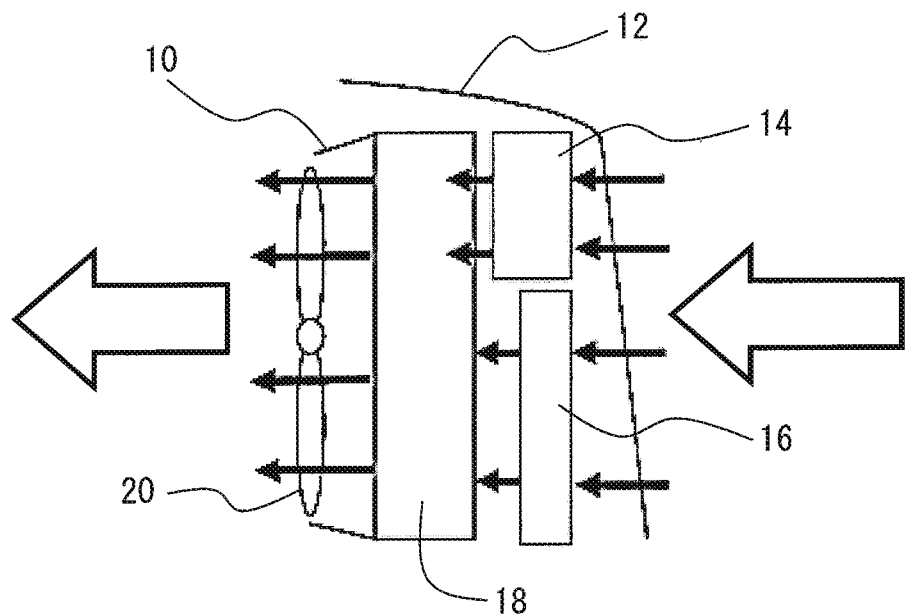
FIG. 1 is a schematic side elevation in cross-section of a heat exchanger system under the bonnet of an off highway vehicle.

FIG. 1 shows a heat exchanger system for an off highway vehicle. Underneath a bonnet 12 of the vehicle, a charge air cooler 14 and an oil cooler 16 are mounted upstream of a radiator 18, which itself is upstream of a fan 20.

The charge air cooler 14 is mounted above the oil cooler 16. The system is compact, but all of the air reaching the radiator 18 has passed through either the charge air cooler 14 or the oil cooler 16. The air therefore has been heated to some degree so that the cooling achieved by the radiator 18 may be less effective.

First Embodiment

A heat exchanger system 10 of the first embodiment comprises a radiator 18, an oil cooler 16 and a multiple core charge air cooler (CAC) 14. The CAC 14 comprises two interconnected cores 14a, 14b. The system 10 is arranged to be housed under the bonnet or a grille 12 of an off highway vehicle.

Figure 2:
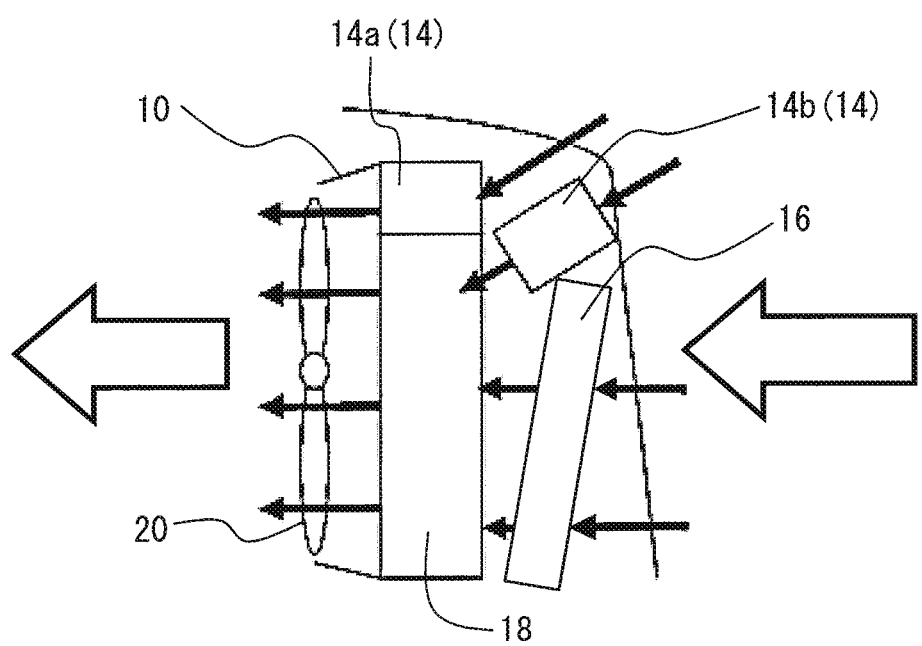
FIG. 2 is the same schematic view of a heat exchanger system according to the first embodiment of the disclosure.

FIG. 2 is a schematic view which highlights the differences from the comparative example. A first CAC core (first core) 14a is mounted directly above the radiator 18, in other words it is mounted in a direction perpendicular to the air flow direction and generally in the plane of the radiator 18 so that it is neither upstream nor downstream of the radiator 18. It receives ambient, unheated air at its input, and the output from the first CAC core 14a is emitted downstream of the radiator 18.

The second CAC core (second core) 14b remains upstream of the radiator 18, but is tilted.

The oil cooler 16 is also tilted away from the radiator 18 so that the upper part of the oil cooler 16 is further from the radiator 18 than the lower part of the oil cooler 16.

Figure 4:
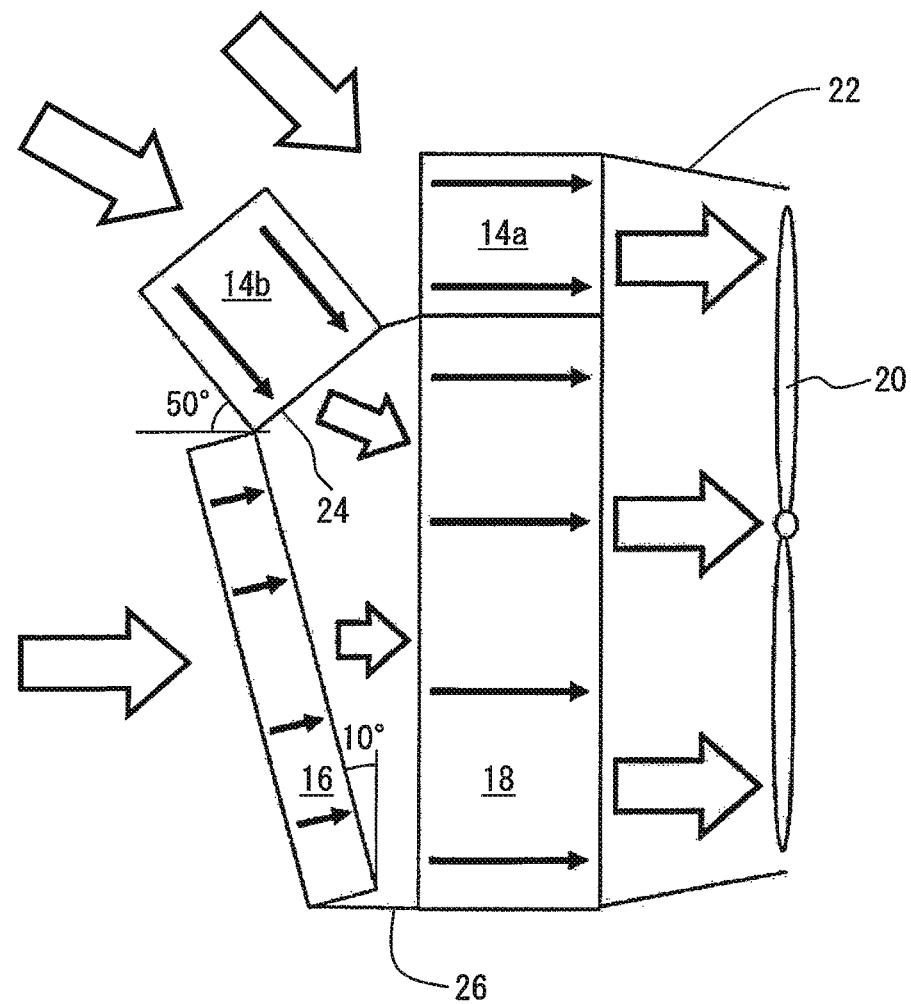
FIG. 4 is a more detailed schematic side elevation of the heat exchanger system of the first embodiment.
Figure 5:
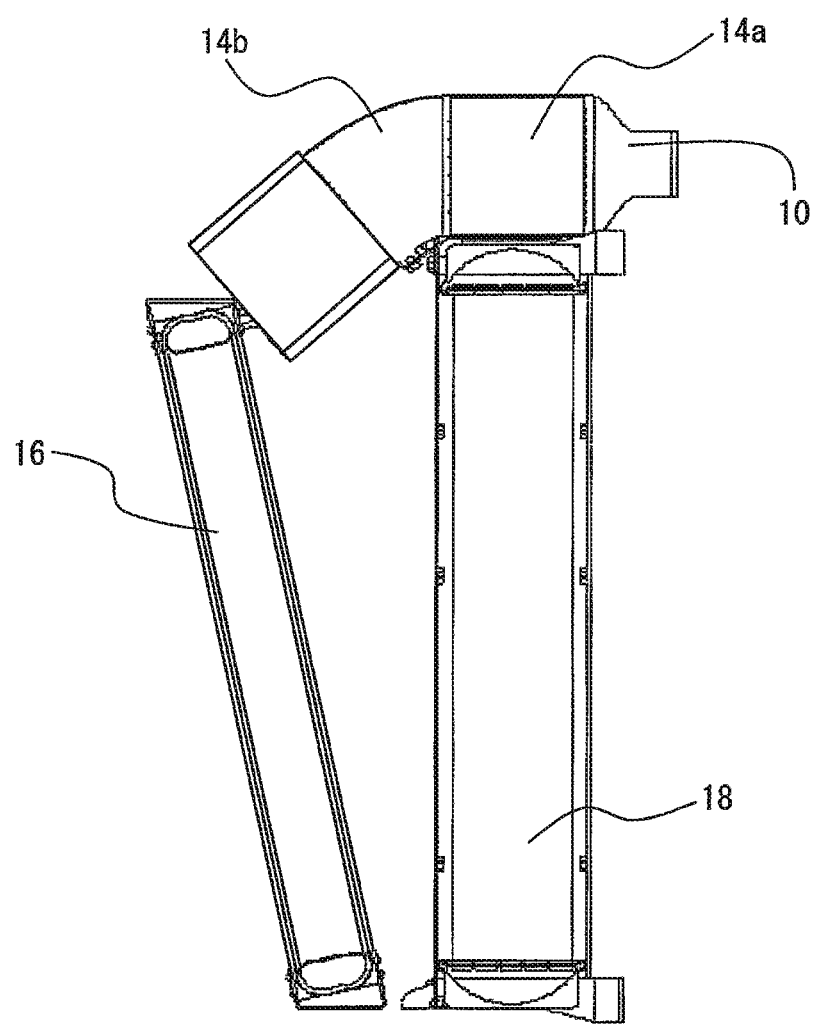
FIG. 5 is a side elevation of the heat exchanger system of the first embodiment.

This arrangement is shown in more detail in FIG. 4. The second CAC core 14b is tilted forwards at an angle of 50° to the horizontal. The oil cooler 16 is tilted backwards at an angle of 10° to the vertical. The first and second CAC cores 14a, 14b are identical.

FIG. 4 shows a shroud 22 leading from the fan 20 to the lower extent of the radiator 18 and the upper extent of the first CAC core 14a. A baffle plate 24 is provided between the lower edge of the first CAC core 14a and the adjacent side of the second CAC core 14b so that air preheated by the second CAC core 14b and oil cooler 16 cannot enter the first CAC core 14a. A cowl 26 is provided between the oil cooler 16 and the radiator 18 to improve the effectiveness of the fan 20 in drawing air through the system 10.

Figure 3:
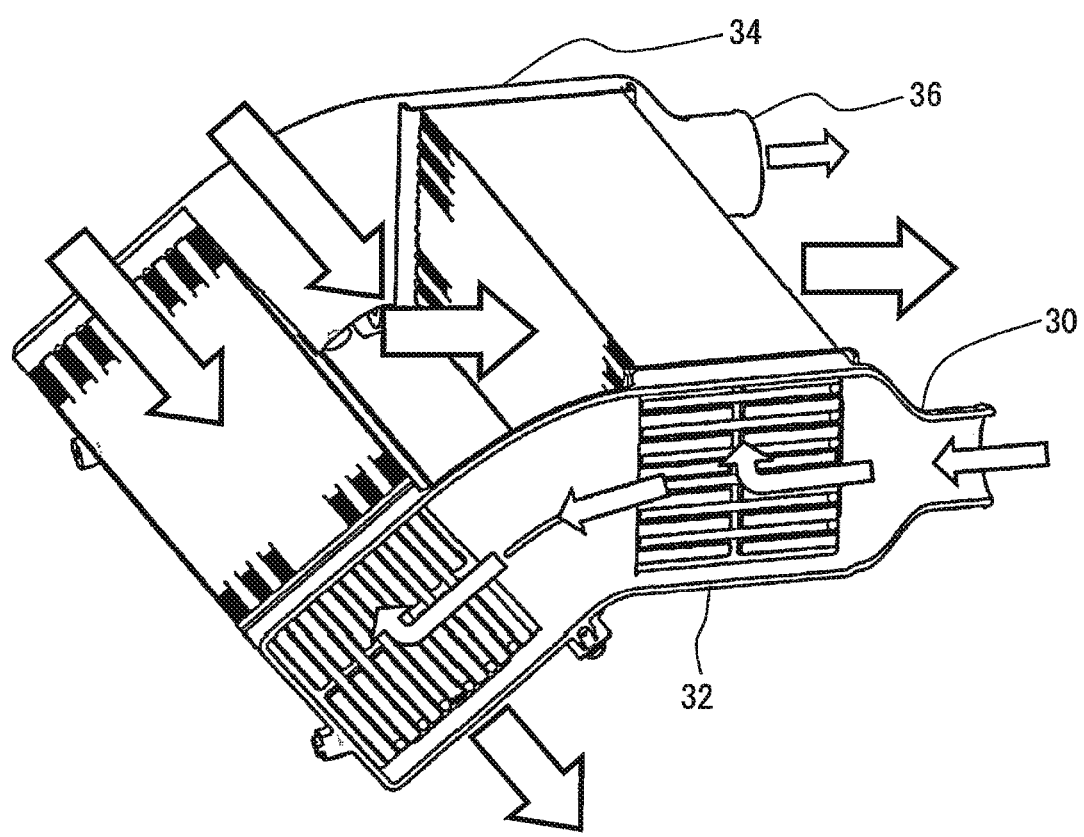
FIG. 3 is a perspective view of the charge air cooler of the first embodiment.

FIG. 3 shows how the first and second CAC cores 14a, 14b are interconnected. At one end of the first CAC core 14a is a charge air inlet 30 leading to the charge air cooler inlet tank 32 which is connected to the inlet ends of both of the charge air cores 14a, 14b. The outlet ends of the CAC cores 14a, 14b are connected to a CAC outlet tank 34 which leads to a charge air outlet 36.

The multiple core charge air cooler 14 of the embodiment may improve the performance of the radiator 18 and the system 10 as a whole. Because the air from the first CAC 14a does not enter the radiator 18, the radiator 18 receives less preheated air and so its performance is improved. The improvement of performance can be such that a smaller radiator can be used than in the comparative example in order to achieve the same or better performance. The tilting of the oil cooler 16 means that it is easier to clean the area between the oil cooler 16 and radiator 18, but also means that the oil cooler 16 can be taller, increasing the area for heat exchange and therefore improving again the heat exchange performance of the system 10.

In the embodiment shown, there is a fully closed baffle 24. The baffle 24 can be varied in other embodiments and can be partially or fully open (no baffle), so that the extent of the baffle can be used to further thermally balance the system.

While the embodiment shows two CAC cores 14a, 14b, in other embodiments there could be more than two cores, in particular three or four cores.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A heat exchanger system comprising:
a radiator; and
a charge air cooler including:
a first core that is located adjacent directly to the radiator in a direction perpendicular to an air flow direction and generally in a plane of the radiator, neither upstream nor downstream of the radiator;
a second core that is located at an angle and tilted relative to the radiator and upstream of the radiator in an air path so that an air outlet of the second core faces the radiator without facing the first core;
a common inlet tank that is in fluid communication with the first core and the second core and distributes a charge air to the first core and the second core; and
a common outlet tank that is in fluid communication with the first core and the second core and collects the charge air flowing out of the first core and the second core,
the first core takes in an ambient air and discharges the ambient air so that the ambient air does not pass through the radiator, and
the second core takes in an ambient air and discharges the ambient air so that the ambient air passes through the radiator but not through the first core.

2. The heat exchanger system of claim 1, wherein the first core is mounted on top of the radiator.

3. The heat exchanger system of claim 1, wherein the first core and the second core are of the same size.

4. The heat exchanger system of claim 1, wherein the second core is at an angle to the radiator in a range 30 to 60°.

5. The heat exchanger system of claim 1, wherein the second core is at an angle to the radiator in a range 40 to 50°.

6. The heat exchanger system of claim 1, further comprising: an oil cooler upstream of the radiator.

7. The heat exchanger system of claim 6, wherein the oil cooler is tilted away from the radiator.

8. The heat exchanger system of claim 7, wherein an angle of tilt of the oil cooler is in a range 5 to 20°.

9. The heat exchanger system of claim 7, wherein an angle of tilt of the oil cooler is in a range 8 to 12°.

10. The heat exchanger system of claim 6, wherein the second core is mounted above the oil cooler.

11. A heat exchanger system comprising
a radiator; and
a charge air cooler including:
a common inlet tank;
a common outlet tank facing the common inlet tank along a first direction;
a first core positioned between the common inlet tank and the common outlet tank and being in fluid communication with the common inlet tank and the common outlet tank; and
a second core positioned between the common inlet tank and the common outlet tank and being in fluid communication with the common inlet tank and the common outlet tank, wherein
the common inlet tank distributes a charge air to the first core and the second core,
the common outlet tank collects the charge air flowing out of the first core and the second core,
the second core is distanced from the first core along a second direction perpendicular to the first direction and is tilted relative to the first core, and
the first core is located adjacent directly to the radiator in a third direction perpendicular to both of the first direction and the second direction and generally in a plane of the radiator.

12. The heat exchanger system of claim 11, wherein the first core takes in an ambient air and discharges the ambient air directly to a downstream side of the radiator, and
the second core takes in an ambient air and discharges the ambient air to an upstream side of the radiator.

13. The charge air cooler of claim 11, wherein the first core includes:
a charge-air inlet surface and a charge-air outlet surface facing each other along the first direction; and
an ambient-air inlet surface and an ambient-air outlet surface facing each other along the second direction,
the first core allows the charge air to flow therethrough in a direction parallel to the first direction and allows an ambient air to flow therethrough in a direction parallel to the second direction, and
the ambient-air inlet surface of the first core is distanced from the second core along the second direction to define a flow path between the ambient-air inlet surface of the first core and the second core through which the ambient air flows to the first core while bypassing the second core.

* * * * *